United States Patent [19]

Karpinski

[11] 4,304,824

[45] Dec. 8, 1981

[54] FLEXIBLE MODULAR INSULATION

[76] Inventor: Ralph E. Karpinski, 713 Daytona Dr., Palm Bay, Fla. 32905

[21] Appl. No.: 205,283

[22] Filed: Nov. 10, 1980

[51] Int. Cl.$^3$ .......................... B32B 1/04; B32B 3/02; B32B 3/24

[52] U.S. Cl. .......................................... 428/69; 428/71; 428/76; 428/157; 428/166; 428/194

[58] Field of Search ....................... 428/69, 71, 74, 76, 428/157, 166, 178, 194

[56] References Cited

U.S. PATENT DOCUMENTS

| | | | |
|---|---|---|---|
| 3,179,549 | 4/1965 | Strong et al. | 428/69 |
| 3,197,549 | 7/1965 | Good | 174/66 |
| 3,389,195 | 6/1968 | Gianakos et al. | 428/71 |
| 3,563,837 | 2/1971 | Smith et al. | 428/71 |
| 3,813,279 | 5/1974 | Varner, Jr. | 428/166 |
| 3,900,648 | 8/1975 | Smith | 428/71 |
| 3,936,553 | 2/1976 | Rowe | 428/69 |
| 4,172,915 | 10/1979 | Sheptak et al. | 428/69 |

*Primary Examiner*—William J. Van Balen
*Attorney, Agent, or Firm*—Duckworth, Allen, Dyer & Pettis

[57] ABSTRACT

A flexible modular insulation quilt is disclosed having two thin flexible layers fused to the borders and surrounding a plurality of shaped foamed material in a vacuum.

9 Claims, 6 Drawing Figures

FLEXIBLE MODULAR INSULATION

BACKGROUND OF THE INVENTION

This invention relates to thermal insulating materials which may be installed during building construction in the manufacture of extreme weather clothing equipment and gear, auto or sea, and air crafts. More particularly, the invention relates to insulating material which minimize heat transfer through conduction by minimizing the cross-sectional area of contact, and minimize heat transfer through convection by evacuating any fluids from the system. Heat insulation utilizing vacuums are well known. However, insulations utilizing vacumms have generally been limited to containers which are relatively rigid. U.S. Pat. No. 3,179,549 which issued Apr. 20, 1965 to Strong, et al., is an example of this type of system. In that patent a panel including spaced wall is employed wherein the space between the walls is filled at least in part with a filler material comprising filaments of glass or materials of similar characteristics, and the filaments are oriented as perfectly as practicable in a plurality of substantially parallel planes being disposed at random in the parallel planes, the disposition of the planes being transverse or normal to the direction of heat flow between the walls. The space between the walls was evacuated and the filler material supported the walls in the desired space relationship against the inwardly acting force of the atmosphere. In another system described in U.S. Pat. No. 3,936,553, which issued on Feb. 3, 1976 to Rowe, the insulation material is described as having a pair of generally parallel space surface sheets of impervious materials sealed together through thermally insulating material at their free edges. The surface sheets were held together in space relation by a series of transverse pins spaced apart over the area of the surface sheets and the space between the later was evacuated. The edges of the surface sheets are sealed together by means of synthetic foam and the interior is evacuated. This system has the disadvantage that rigid material such as aluminum is used for the surface sheets. Sealing is effectuated by a joinder of dissimilar material which is undesirable for vacuum properties. No means for securing the panels to a wall or method of sizing the panels are disclosed.

The systems of the prior art had the disadvantages of being relatively rigid, heavy, or fragile, while at the same time being difficult to manufacture and relatively expensive. An additional disadvantage is that the seals have been inadequate for the maintenance of a vacuum. These systems are not suited for adaptation for use in different geometries. Rather they have to be custom made for each geometry.

SUMMARY OF THE INVENTION

In accordance with this invention there is provided insulation material comprising a pair of laminated flexible films, or film and metallic foil, surrounding a plurality of pellets of low conduction material. The pellets may be retained in place by a low conductive mesh or screen which provides for dimensional stability. The laminated flexible films are fused at the edges with a border provided for attachment to buildings or other fabrication.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
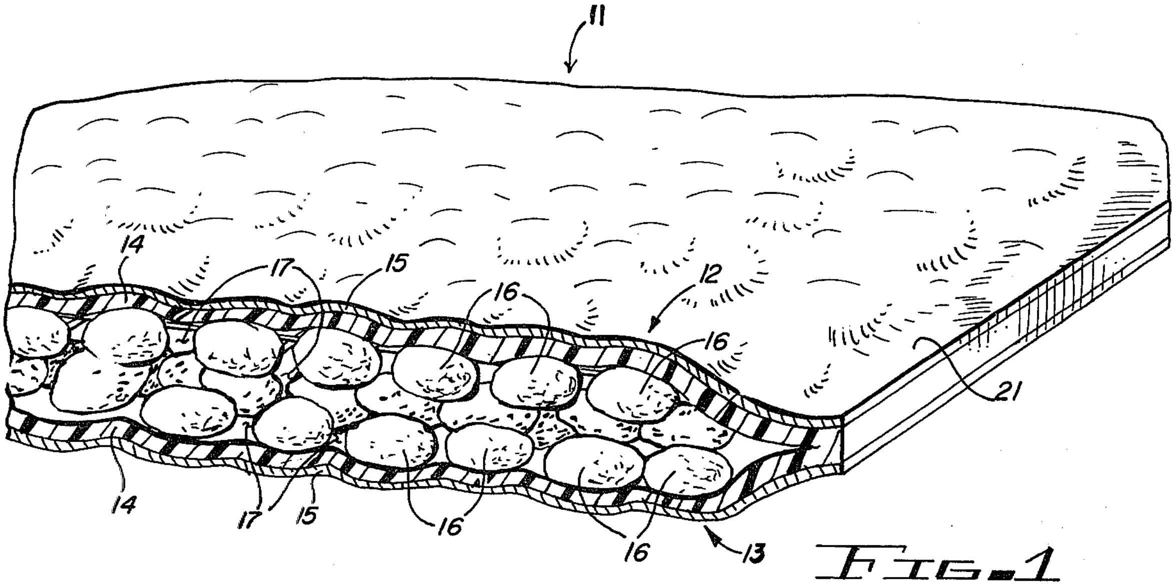
FIG. 1 is a perspective with cutaway view of an insulation modular quilt.

As shown in FIG. 1, a flexible insulation modular quilt 11 comprises two opposed flexible laminate films 12 and 13. Each flexible laminate film comprises a first flexible film 14 of soft plastic such as polyethylene, vinyl, or other similar plastics on the inner surface and an outer flexible film 15 of harder nylon polyester or similar harder plastic material or aluminum foil on the outer surface. The flexible laminate films 12 enclose a plurality of pellets 16 of low conduction material such as expanded polystyrene foamed pellets or other shaped fillers. The pellets 16 are used as structural members to maintain the spacing between the opposed flexible laminate films 12. The voids 17 between the pellets 16 and those within the foamed material are evacuated to provide a substantial vacuum in the insulation. The flexible laminate films 12 and 13 are sealed by fusing the softer polyethylene inner surface using conventional heat at the edges, so as to provide a margin 21 of sufficient width to accomodate conventional attaching means such as staples and the like. The combination of the use of low conduction pellets or other foamed shapes within an evacuated volume surrounded by a flexible envelope provides the advantage of good heat insulation while maintaining a flexible, easy to manage, insulation ensemble. The flexible laminate film 12 comprised of films 14 and 15 may be heat fused, glued, or sealed at the edges by any conventional means.

Figure 2:
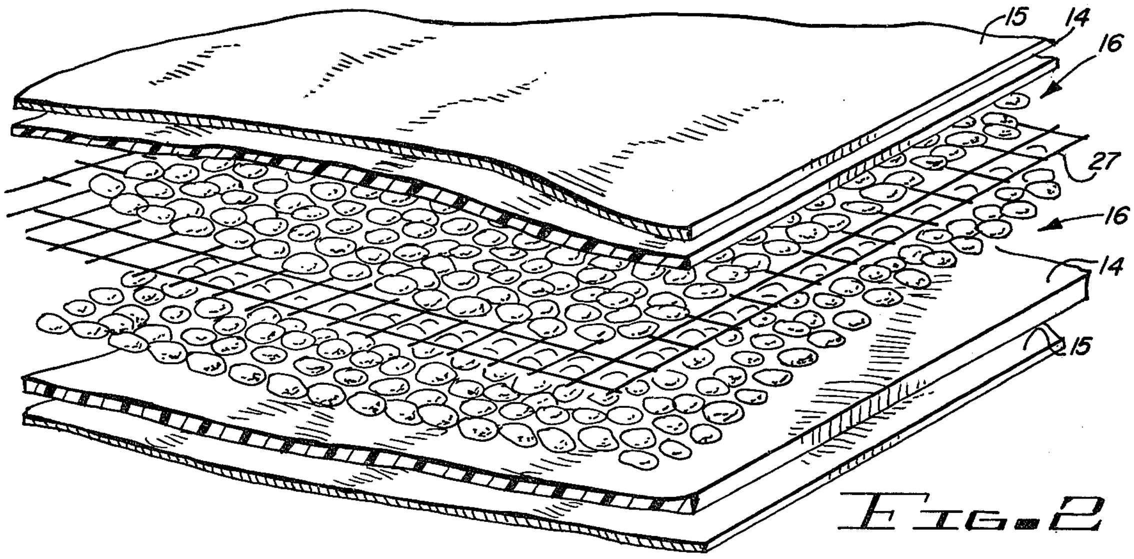
FIG. 2 is a cross-section through the insulation modular quilt.

As can be appreciated from the description of the embodiment depicted in FIG. 1, the insulation panel provided above is not only flexible but quite malleable and may be conformed to a number of different shapes on the site. The embodiment of FIG. 2 is specially suited for applications where a more rigid form of insulation panel is desired, such as one that would retain its form once it has been bent to the desired form. As shown in FIG. 2 a mesh or screen of low conduction material 27 is used to maintain the position of the small bead-like pellets 16; to maintain dimensional stability along a plane under normal atmospheric pressure from the perimeters and sides; and to maintain flexibility when the enclosed volume is air evacuated thus permitting decrease in the thickness and bulk of the insulation as desired.

Figure 3:
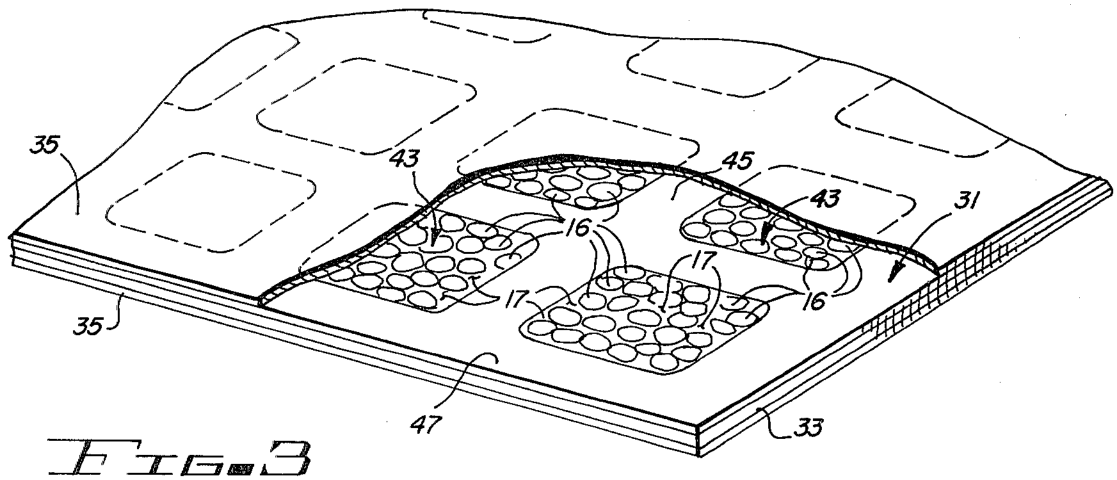
FIG. 3 is an alternative embodiment of an insulation modular quilt.

In order to provide for the manufacture of large sections of insulation and to prevent the destruction of the insulative qualities of an entire panel due to accidental tears of the laminate flexible film, an alternative embodiment shown in FIG. 3 is preferrable. In that embodiment a large sheet 31 of laminate flexible film is provided. The sheet 31 comprises a sheet of soft plastic material 33 such as polyethylene, vinyl or other similar plastic, bonded or coated where applicable, to a sheet of harder plastic material 35, such as nylon, polyester, acrylic or aluminum foil. A plurality of isolated groupings of pellets of insulating material 43 are provided in a repetitive pattern, with or without the intermediate mesh 27. The border 45 between each grouping 43 of insulating pellets is sealed by gluing, or heat fusing, thereby isolating each group of pellets from the other. The voids 17 between the pellets in each grouping 43 is evacuated. The insulation areas are therefore isolated one from the other and any accidental tear of the laminate film covering one of the groupings will not degrade the insulation quality of the entire quilt and allows repair by means of removal of damaged section and replacement with an undamaged module. A border 47 is provided so that the insulation quilt can be attached at the perimeter to a surface by conventional means. Also, panels or portions thereof consisting of one or more modules may be adhesively bonded to fabric, metals or other fabrication as required.

Figure 4:
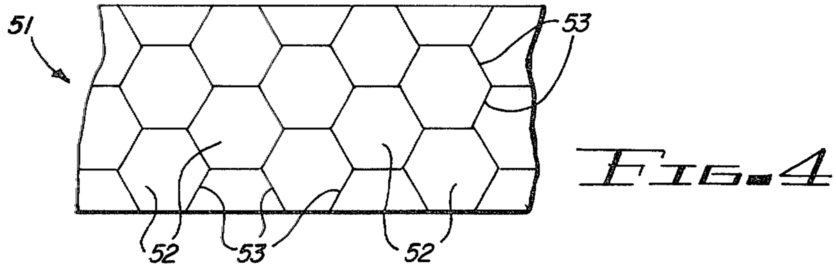
FIG. 4 is a cross-section through a piece of typical foam material.
Figure 5:
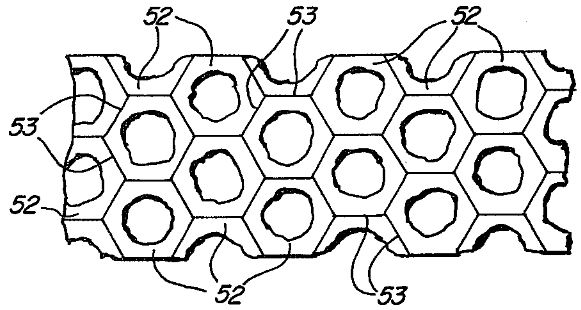
FIG. 5 is a cross-section through a piece of foam material that has been subjected to a vacuum.

The advantage of utilizing foamed material as structural members to maintain the spacing between the opposed flexible laminate film 12 and 13 can be appreciated by reference to FIGS. 4 and 5. There are three types of heat transfer: conduction, convection and radiation. Of these only radiation can occur through a vacuum. Convection occurs in fluids, and conduction occurs both in fluids and in solids.

The basic relation for heat transfer by conduction was proposed by the French scientist, J. B. J. Fourier, in 1822. It states the qk, the rate of heat flow by conduction in a material, is equal to the product of the following three quantities:

1. k, the thermal conductivity of the material.
2. A, the area of the section through which heat flows by conduction, to be measured perpendicularly to the direction of heat flow.
3. dT/dx, the temperature gradient at the section i.e., the rate of change of temperature T with respect to distance in the direction of heat flow x.

To write the heat conduction equation in mathematical form, we must adopt a sign convention. We specify that the direction of increasing distance x is to be the direction of positive heat flow. Then, since according to the second law of thermodynamics heat will automatically flow from points of higher temperature to points of lower temperature, heat flow will be positive when the temperature gradient is negative. Accordingly, the elementary equation for one-dimensional conduction in the steady state is written $$qk = -kA\,(dT/dx)$$

It is apparent from the formula above that by minimizing the area A, the rate of heat transfer is minimized.

The rate of heat transfer by convection between a surface and a fluid may be computed by the relation $$q_c = \bar{h}_c A\ T$$

where $q_c$ = rate of heat transfer by convection, Btu/hr;

A = heat transfer area, sq. ft.; T = difference between the surface temperature T and a temperature of the fluid T at some specified location (usually far away from the surface, F;

$\bar{h}_c$ = average unit thermal convective conductance (often called the surface coefficient of heat transfer or the convective heat-transfer coefficient) Btu/hr sq. ft. F.

Engineers have used this equation for many years, even though it is a definition of $\bar{h}_c$ rather than a phenomeno-logical law of convection. The numerical value of $\bar{h}_c$ in a system depends on the geometry of the surface and the velocity, as well as on the physical properties of the fluid and often even on the temperature difference T. One of the important physical properties of the fluid that affects the value of $\bar{h}_c$ is density. The lower the density the lower the value of $\bar{h}_c$.

The microscopic cross-section of a piece of typical foam pellet 51, shown in FIG. 4, illustrates that such material is made of a plurality of shaped bubbles 52 contained within a matrix of plastic material 53. The shape of the bubbles 52 is due to the equal pressure that exists when the material is blown into expanded form. The lines 53 form the filament like grid due to many bubble walls being compressed together. The shape 52 is created by a mutually shared wall of many bubbles and are consequently very thin. Each bubble 52 contains gas such as air which can transfer heat both by conduction and by convection. The total rate of heat transfer is then sum of $$q_{total} = qk_{plastic}\ qk_{gas} + qc_{gas}$$

where $qk_{plastic}$ is the rate of heat transfer by conduction for the plastic.

$qk_{gas}$ is the rate of heat transfer by conduction for the gas bubbles, and $qc_{gas}$ is the rate of heat transfer by convection through the gas in the bubbles.

When the foamed plastic material is subjected to a vacuum the material is modified. FIG. 5 shows a cross-section of such material which has been subjected to a vacuum. The walls of the bubbles 52 explode outwardly due to the pressure differential between the gas in the bubble and the exterior vacuums. As the bubbles burst the gas contained in the bubbles is evacuated so that what is left is a cribiform matrix of plastic material 53 of low conductivity, which under the load of atmospheric pressure does not totally collapse but deforms from the surface inwardly, leaving the matrix elements intact throughout the greater cross-section and intact but deformed at the points of pressure contact. Thus, heat flow channelization remains lengthy.

Figure 6:
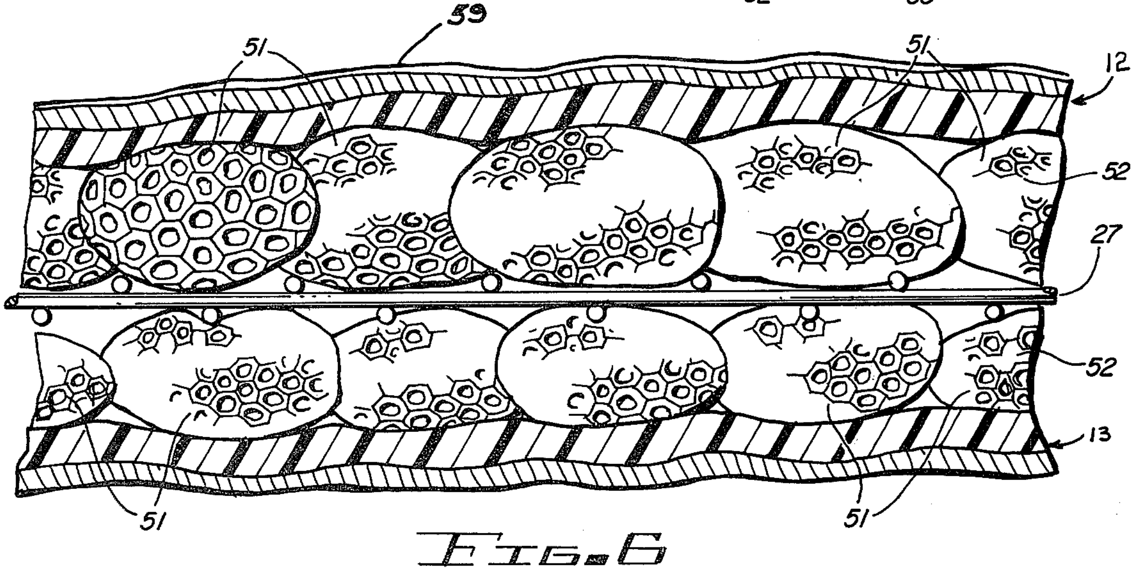
FIG. 6 is an alternate embodiment of an insulation modular quilt.

The pellet 51 which has been subjected to a vaccuum is incorporated into the insulation quilt 11 shown in greater detail in FIG. 6. The vacuum is maintained by the fusing of flexible laminate film 14 made as described above. With such a configuration heat transfer convection is reduced greatly because there is very little fluid contained in the insulation quilt. Conduction is also reduced because the cross-sectional of each pellet 51 is greatly reduced by the numerous holes left by the burst bubbles 52. The heat transfer by conduction is also reduced because the direction of positive heat flow x is increased in distance by being channelized along the filaments of the matrix only. That is the heat flow must now travel a circuitous route through the cribriform matrix of plastic material 53. Finally, heat transfer by radiation can also be decreased if a thin layer of highly reflective material 59 is bonded to the flexible laminate film 12 and/or 13. The end result is a highly efficient insulation quilt 11.

I claim:

1. A flexible, modular insulation quilt comprising:
   a pluraity of pellets of insulation material in a vacuum,
   a pair of opposed laminate films of flexible plastic material disposed at either side of said plurality of pellets and fused at all edges, whereby the vacuum is maintained, and
   means integrally formed of said laminate films for attaching the insulation panel to a desired surface.
2. The flexible, modular insulation quilt of claim 1 wherein each of said laminate films comprises:
   a thin interior flexible film of soft plastic material, and
   a thin exterior flexible film of harder plastic material bonded to said thin interior film.
3. The flexible, modular insulation quilt of claim 1 wherein each of said laminate films comprises:
   a thin interior flexible film of soft plastic material; and
   a thin exterior film of aluminum foil bonded to said thin interior film.
4. The flexible, modular insulation quilt of claim 1 further comprising a thin mesh of low conductive material disposed centrally of said plurality of pellets of insulation material.
5. The flexible, modular insulation quilt of claim 1 wherein said plurality of pellets comprises a plurality of pellets of foamed plastic material.
6. The flexible, modular quilt of claim 5 wherein said pellets of foamed plastic material is devoid of any interior gas.
7. The flexible, modular insulation quilt of claim 1 further comprising a layer of heat reflective material bonded to one or both of said laminate films.
8. The flexible, modular insulation quilt of claim 1 wherein said means for attaching comprises a margin of bonded laminate film disposed on all sides of said plurality of pellets.
9. The flexible, modular insulation quilt of claim 1 wherein said means of attaching comprises adhesive bonding to a protective covering.

* * * * *